US007418000B2

(12) United States Patent
Bruckman et al.

(10) Patent No.: US 7,418,000 B2
(45) Date of Patent: Aug. 26, 2008

(54) AUTOMATED WEIGHT CALCULATION FOR PACKET NETWORKS

(75) Inventors: Leon Bruckman, Petah Tikva (IL); Gal Mor, Herzliya (IL)

(73) Assignee: Corrigent Systems Ltd. (IL)

( * ) Notice: Subject to any disclaimer, the term of this patent is extended or adjusted under 35 U.S.C. 154(b) by 717 days.

(21) Appl. No.: 10/861,272

(22) Filed: Jun. 3, 2004

(65) Prior Publication Data

US 2005/0271084 A1    Dec. 8, 2005

(51) Int. Cl.
    *H04L 12/28* (2006.01)
(52) U.S. Cl. ...................................... 370/412; 370/468
(58) Field of Classification Search ................. 370/412, 370/395.41, 395.42, 395.43
    See application file for complete search history.

(56) References Cited

U.S. PATENT DOCUMENTS

| 5,461,611 | A | 10/1995 | Drake, Jr. et al. | |
|---|---|---|---|---|
| 6,021,263 | A | 2/2000 | Kujoory et al. | |
| 6,157,654 | A * | 12/2000 | Davis | 370/412 |
| 6,178,159 | B1 * | 1/2001 | He et al. | 370/234 |
| 6,359,861 | B1 * | 3/2002 | Sui et al. | 370/230 |
| 6,370,121 | B1 | 4/2002 | Hausman | |
| 6,400,681 | B1 | 6/2002 | Bertin et al. | |
| 6,584,535 | B1 | 6/2003 | Ouellet et al. | |
| 6,647,008 | B1 | 11/2003 | Galand et al. | |
| 6,678,241 | B1 | 1/2004 | Gai et al. | |
| 6,757,286 | B1 | 6/2004 | Stone | |
| 6,795,394 | B1 | 9/2004 | Swinkels et al. | |
| 6,801,506 | B1 | 10/2004 | Dey | |
| 6,826,147 | B1 | 11/2004 | Nandy et al. | |
| 6,826,158 | B2 | 11/2004 | Seaman et al. | |
| 6,922,394 | B2 | 7/2005 | Kajiwara | |
| 6,934,259 | B2 | 8/2005 | Klincewicz et al. | |
| 7,065,044 | B2 | 6/2006 | Wang et al. | |
| 7,092,356 | B2 | 8/2006 | Rabie et al. | |
| 7,197,008 | B1 | 3/2007 | Shabtay et al. | |
| 2001/0026535 | A1 * | 10/2001 | Amou et al. | 370/235 |
| 2001/0032271 | A1 | 10/2001 | Allen | |
| 2002/0163885 | A1 * | 11/2002 | Assa et al. | 370/230.1 |
| 2002/0176358 | A1 * | 11/2002 | Assa et al. | 370/229 |

(Continued)

OTHER PUBLICATIONS

Office Action dated Sep. 15, 2004, for related U.S. Appl. No. 09/794,898, filed Feb. 26, 2001, 10 pages.

(Continued)

*Primary Examiner*—Chau Nguyen
*Assistant Examiner*—Suk Jin Kang
(74) *Attorney, Agent, or Firm*—Townsend and Townsend and Crew LLP

(57) ABSTRACT

A method for communication includes setting respective overbooking ratios for multiple categories of data traffic, and assigning respective bandwidth allocations to a plurality of connections for transmitting the data traffic in one or more of the categories over a network. The data traffic from the connections is coupled into respective queues, such that each of the queues is associated with one or more of the connections. Respective weights are computed for the queues responsively to the bandwidth allocations and to the overbooking ratios of the categories of the data traffic to be transmitted on the connections that are associated with each of the queues. A multiplexer multiplexes among the queues responsively to the respective weights so as to transmit the data traffic from the connections over a link in the network.

16 Claims, 3 Drawing Sheets

U.S. PATENT DOCUMENTS

| | | |
|---|---|---|
| 2002/0186881 A1 | 12/2002 | Santiago et al. |
| 2003/0002443 A1 | 1/2003 | Basso et al. |
| 2003/0055920 A1 | 3/2003 | Kakadia et al. |
| 2003/0147352 A1 | 8/2003 | Ishibashi et al. |
| 2003/0185217 A1 | 10/2003 | Ganti et al. |
| 2004/0071089 A1 | 4/2004 | Bauer et al. |
| 2004/0085964 A1* | 5/2004 | Vaananen ................ 370/395.4 |
| 2004/0109408 A1 | 6/2004 | Mesh et al. |

OTHER PUBLICATIONS

U.S. Appl. No. 10/054,845, filed Jan. 2002, Katz.

Office Action dated Mar. 21, 2006 for U.S. Appl. No. 10/128,454.

\* cited by examiner

AUTOMATED WEIGHT CALCULATION FOR PACKET NETWORKS

FIELD OF THE INVENTION

The present invention relates generally to communication networks, and specifically to methods and systems for managing the flow of traffic over a network link that is shared by multiple connections.

BACKGROUND OF THE INVENTION

Network service providers frequently aggregate communication traffic from multiple sources for transmission over a shared, high-bandwidth link. Service providers commonly overbook their available bandwidth in order to maximize utilization of this costly resource. In other words, the sum of the bandwidth that the service provider makes available to all traffic sources may exceed the actual bandwidth available on the shared link. Most of the time, the traffic sources generate less than their full bandwidth allocation, so that the aggregated traffic volume is less than the shared link capacity, and all of the traffic is transmitted over the shared link at the rate at which the traffic is generated by the sources. During periods of peak demand, however, the aggregated traffic volume may exceed the shared link capacity. In this case, at least some of the traffic must be buffered, and frames may be dropped if the buffer overflows.

To determine how bandwidth is to be shared during periods of heavy demand, service providers typically define multiple classes of services, with different bandwidth allocations and priorities. Each class of service (CoS) may have a committed information rate (CIR), which the service provider guarantees to provide, and an excess information rate (EIR), which the service provider provides on a best-efforts basis. (Some classes of service may have only a CIR allocation, or only an EIR allocation.) Each connection served by the service provider belongs to a specific class of service (CoS), which may be specified in a service level agreement (SLA) between the service provider and the customer making the connection. In aggregating traffic for transmission over the shared link, the service provider attempts to ensure that all traffic within the CIR of each connection is transmitted. The service provider then divides any remaining capacity among the connections according to their EIR allocations.

Service providers generally try to allocate their available bandwidth fairly among their customers. For this purpose, incoming data packets arriving from different sources are queued, and the traffic aggregator multiplexes among the queues in accordance with a fair scheduling scheme. Different weights may be assigned to different queues in order to permit different sources to receive different relative shares of the available capacity. Various fair scheduling schemes are known in the art. In Fair Queuing, for example, if there are N active queues at any given time, each queue receives 1/N of the available bandwidth. In Weighted Fair Queuing (WFQ), different queues may have different service shares according to their relative weights. In some applications of WFQ, including some embodiments of the present invention that are described hereinbelow, each source or connection has its own queue, an ill-behaved source (generating more than its fair share of traffic) will only punish itself and not other sources. Weighted Round Robin (WRR) scheduling operates on similar principles.

U.S. Pat. No. 6,157,654, whose disclosure is incorporated herein by reference, describes a method for adaptively assigning queue service weights to an ATM traffic management controller in order to reduce service weight update calculations. The queue weight configuration is performed using a reconfigurable weighted fair queuing controller, wherein bandwidth requirements for each queue may be changed in response to connection setup and release values.

SUMMARY OF THE INVENTION

The success of a weighted scheduling method, such as WFQ or WRR, in allocating link bandwidth or other resources fairly and efficiently depends on how well the weights accord with the actual classes of service and other parameters of the connections that are active on the link. When a connection is added or removed from the link, the weights should be adjusted to account for the change. In practice, however, in systems known in the art, there is no systematic way to ensure that the weights are really fair at all times or take into account the relative importance and urgency of different types of service.

Embodiments of the present invention provide methods and systems for automatic computation of weights for use in fair scheduling schemes in a communication network. In some of these embodiments, a multiplexer, such as an aggregator, connects multiple sources to a shared link. The multiplexer has multiple queues, each serving one or more connections originating from one or more respective sources. Each connection is designated to carry a certain category or categories of data traffic, which are typically expressed in terms of classes of service. Each connection or class of service has a specified bandwidth allocation, which may include both committed (CIR) and excess (EIR) bandwidth components.

A controller associated with the multiplexer calculates a weight contribution for each connection, based on its specified bandwidth allocation and on the overbooking ratios of the categories of data traffic that the connection may use. Higher levels of expected service (in terms of reliability and low-latency packet delivery) of certain traffic categories are typically reflected by lower overbooking ratios in these categories, and vice versa. Therefore, the connection weight contributions are biased depending on the overbooking ratios so as to give greater weight to categories with low overbooking than to those with high overbooking. For example, the weight contribution may be biased in inverse proportion to the overbooking ratios. The controller then computes a queue weight for each queue as a sum of the weight contributions of the connections served by the queue. When a connection is added, removed or modified, the controller modifies the queue weights accordingly. Use of the connection parameters, and specifically the overbooking ratio, in this manner permits fair weights to be computed and updated automatically, substantially without operator involvement.

Although the embodiments described hereinbelow relate specifically to aggregation of traffic for transmission over a shared network link, the principles of the present invention may similarly be applied in fair scheduling schemes used to allocate other network and processing resources among multiple traffic flows.

There is therefore provided, in accordance with an embodiment of the present invention, a method for communication, including:

setting respective overbooking ratios for multiple categories of data traffic;

assigning respective bandwidth allocations to a plurality of connections for transmitting the data traffic in one or more of the categories over a network;

coupling the data traffic from the connections into respective queues, such that each of the queues is associated with one or more of the connections;

computing respective weights for the queues responsively to the bandwidth allocations and to the overbooking ratios of the categories of the data traffic to be transmitted on the connections that are associated with each of the queues; and multiplexing among the queues responsively to the respective weights so as to transmit the data traffic from the connections over a link in the network.

Typically, computing the respective weights includes biasing the weights so as to favor, in determining the weights, the categories of the data traffic for which the respective overbooking ratios are relatively smaller over the categories of the data traffic for which the respective overbooking ratios are relatively greater. In a disclosed embodiment, biasing the weights includes weighting the bandwidth allocations in inverse proportion to the overbooking ratios in order to compute the respective weights.

In disclosed embodiments, computing the respective weights includes computing respective weight contributions of the connections responsively to the categories of the data traffic transmitted on each of the connections, and summing the weight contributions of the connections that are associated with each of the queues. Typically, the multiple categories includes classes of service, each having at least one of a committed information rate (CIR) and an excess information rate (EIR) and having respective CIR and EIR overbooking ratios, and assigning the respective bandwidth allocations includes assigning each of the connections to at least one of the classes of service, and computing the respective weight contributions includes determining the weight contributions responsively to the classes of service of the connections. In one embodiment, computing the respective weight contributions includes setting a respective weight contribution of each of the connections belonging to a given class of service $CoS_j$ to be $\alpha(CoS_j)CIR(CoS_j)+\beta(CoS_j)EIR(CoS_j)$, wherein $\alpha$ and $\beta$ are bias coefficients that are determined responsively to the CIR and EIR overbooking ratios of the given class of service, and $\alpha$ and $\beta$ may be respectively inversely proportional to the CIR and EIR overbooking ratios of the given class of service.

Additionally or alternatively, multiplexing among the queues includes preferentially serving a guaranteed portion of the CIR, and multiplexing a remainder of the CIR and the EIR, and setting a respective weight contribution of each of the connections belonging to a given class of service $CoS_j$ to be $\alpha(CoS_j)CIR(CoS_j)[1-1/OVB_{CIR}(CoS_j)]+\beta(CoS_j)EIR(CoS_j)$, wherein $OVB_{CIR}$ is the overbooking ratio of the CIR in the given class of service.

In some embodiments, the multiple categories includes classes of service, each having at least one of a committed information rate (CIR) and an excess information rate (EIR) and having respective CIR and EIR overbooking ratios, and assigning the respective bandwidth allocations includes assigning each of the connections to at least one of the classes of service, and wherein computing the respective weights includes determining the weights responsively to the classes of service of the connections. Typically, computing the respective weights includes biasing the weights, responsively to the overbooking ratios, so that the CIR has a relatively greater impact on the weights than does the EIR.

In one embodiment, computing the respective weights includes applying a non-linear mapping to the computed weights.

There is also provided, in accordance with an embodiment of the present invention, apparatus for conveying data traffic over a plurality of connections on a network, each connection being configured to carry one or more categories of the data traffic, the apparatus including:

a multiplexer, which includes a set of queues, each such queue being configured to receive the data traffic on one or more of the connections that are associated with the queue, and which is adapted to multiplex among the queues responsively to respective weights that are assigned to the queues so as to transmit the data traffic from the queues over a link in the network; and a controller, which is coupled to receive a definition of respective bandwidth allocations and respective overbooking ratios of the categories of the data traffic carried by each of the connections, and which is adapted, responsively to the definition, to compute the respective weights to be assigned to the queues responsively to the bandwidth allocations and to the overbooking ratios of the categories of the data traffic carried by the connections that are associated with each of the queues.

The present invention will be more fully understood from the following detailed description of the embodiments thereof, taken together with the drawings in which:

DETAILED DESCRIPTION OF EMBODIMENTS

Figure 1:
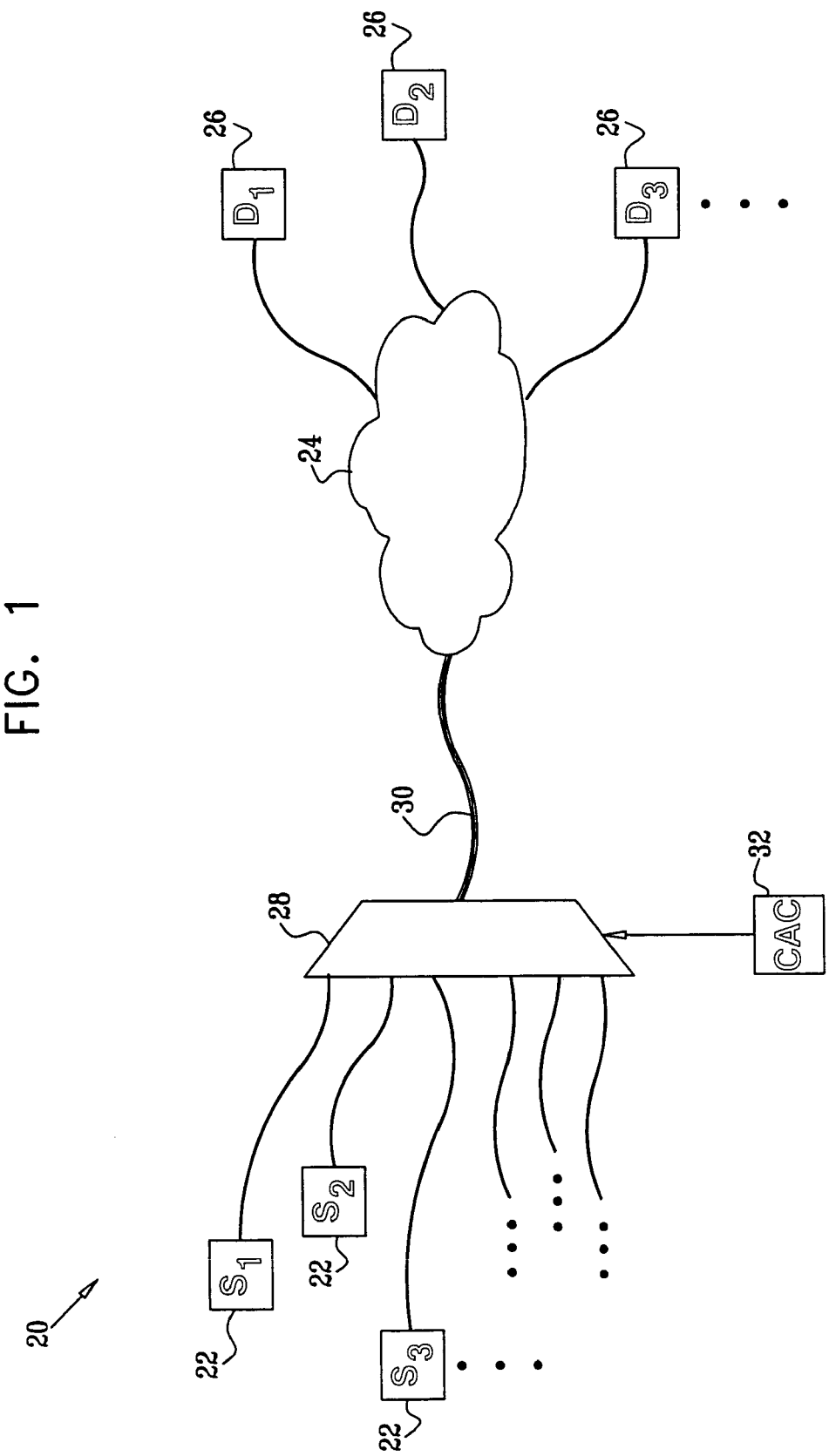
FIG. 1 is a block diagram that schematically illustrates a packet communication network, which is operative in accordance with an embodiment of the present invention.

FIG. 1 is a block diagram that schematically illustrates a communication network 20, which is operative in accordance with an embodiment of the present invention. For clarity of explanation, the description that follows refers to transmission of data traffic over network 20 in the form of packets. The term "packets" in this context is defined broadly to cover all types of packet data that may be multiplexed in the manner described hereinbelow, including packets of types that are conventionally referred to as data frames or cells. The principles of the present invention are particularly useful in networks that carry packets of variable length, such as Internet Protocol (IP) networks, but they are also applicable generally to any sort of network communication traffic that undergoes statistical multiplexing.

In network 20, multiple sources 22 ($S_1, S_2, \ldots$) transmit data over respective connections to destinations 26 ($D_1, D_2, \ldots$) via a core network 24. Generally speaking, a given source 22 may transmit data flows to multiple different destinations. Each flow is characterized by a class of service (CoS), which defines a priority level of the traffic between the source and destination of the flow. Typically, the CoS priority is defined in terms of guaranteed (CIR) and best-efforts (EIR) bandwidth allocations to the given CoS, which are commonly expressed in bits/sec (bps). Alternatively, bandwidth allocations may be defined for more than two categories of traffic per CoS, i.e., there may be one or more additional categories of bandwidth allocation per CoS besides CIR and EIR. The term "connection," as used in the present patent application and in the claims, is defined by the combination of a source node, a destination node and a CoS. In other words, one connection may carry multiple flows, and there may be multiple connections between a given pair of source and destination nodes. Connections may include, for example, a VLAN or a Layer 2 or Layer 3 tunnel, as are known in the art.

In the example shown in FIG. 1, a traffic aggregator 28 multiplexes packets on multiple connections from sources 22 onto a shared link 30, such as a trunk line connected to core network 24. An operator of aggregator 28 defines a certain minimum share of the link bandwidth for each traffic category (such as CIR or EIR) in each CoS, as well as a permitted overbooking ratio for each traffic category in each CoS. The overbooking ratio of a given traffic category is defined as the ratio of the actual bandwidth that may be allocated to all connections for this category of traffic to the minimum bandwidth share of the category. EIR components typically have a high overbooking ratio, while CIR components may be overbooked by a more moderate ratio or not at all. Based on the bandwidth allocations and overbooking ratios, aggregator 28 uses a weighted scheduling scheme, as described below, in order to multiplex the traffic so as to give each connection its fair share of the available bandwidth.

A connection admission controller (CAC) 32 manages the bandwidth allocations to the connections passing through aggregator 28 and controls the aggregator accordingly. For this purpose, CAC 32 uses the CoS definitions that are input by the system operator, including the predefined CIR and EIR allocations and overbooking ratio for each category in each CoS. Based on the known throughput of system 20 (which is in this example dictated by the bandwidth of link 30) and the overbooking ratios, the CAC admits or rejects each request from one of sources 22 to establish a new connection. The CAC assigns the connections to queues in aggregator 28 (or is informed of the assignments by the entity responsible for making the assignments), and computes respective queue weights for the queues based on the assigned connections, as described hereinbelow.

Figure 2:
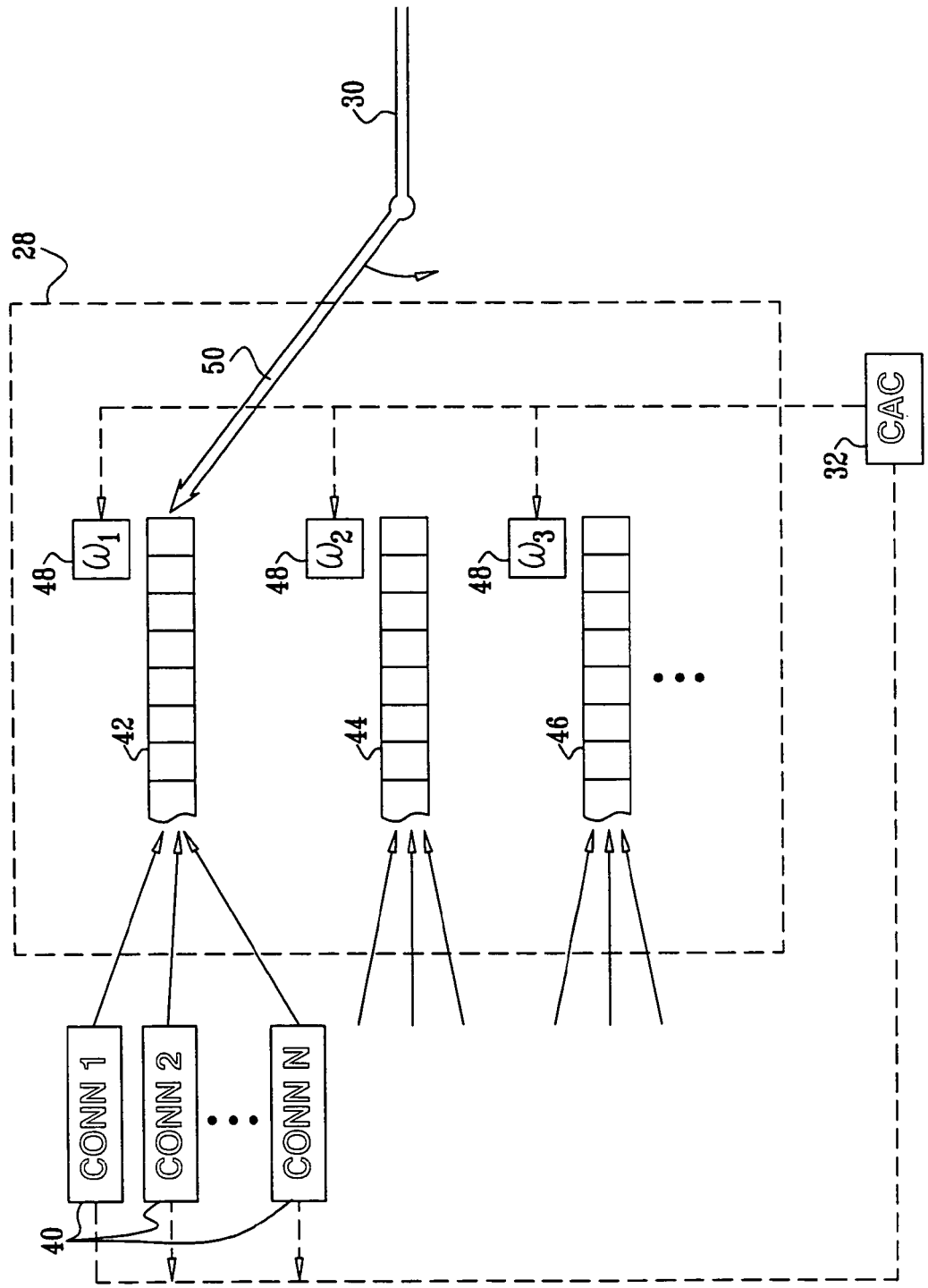
FIG. 2 is a block diagram that schematically shows details of a traffic aggregator that implements a weighted scheduling scheme, in accordance with an embodiment of the present invention.

FIG. 2 is a block diagram that schematically shows details of aggregator 28, in accordance with an embodiment of the present invention. The aggregator receives connections 40 from multiple sources 22. Each connection is assigned to a queue 42, 44, 46, ..., wherein typically multiple connections share the same queue. A system operator determines the bandwidth allocations for each connection or CoS, and inputs this information to CAC 32. The system operator may also determine how the connections are to be grouped in queues 42, according to substantially any suitable criterion. For example, all connections from a given source 22 may be placed in the same queue or, alternatively or additionally, the connections may be grouped according to their classes of service.

Based on the classes of service of the connections that are assigned to each queue, the CAC calculates a respective weight 48 for each queue (labeled $W_1$, $W_2$, $W_3$, ..., in the figure). An exemplary method for weight calculation is described below with reference to FIG. 3. A switch 50 then multiplexes the packets from queues 42, 44, 46, ..., onto link 30 using a fair scheduling algorithm in accordance with weights 48. For example, switch 50 may implement a weighted fair queuing scheme. This scheme provides that each queue will receive a share of the bandwidth on link 30 that is proportional to its respective weight. When a connection is added or removed from any of the queues or is otherwise modified, CAC 32 recalculates the weights automatically, and the queue scheduling is modified accordingly.

Figure 3:
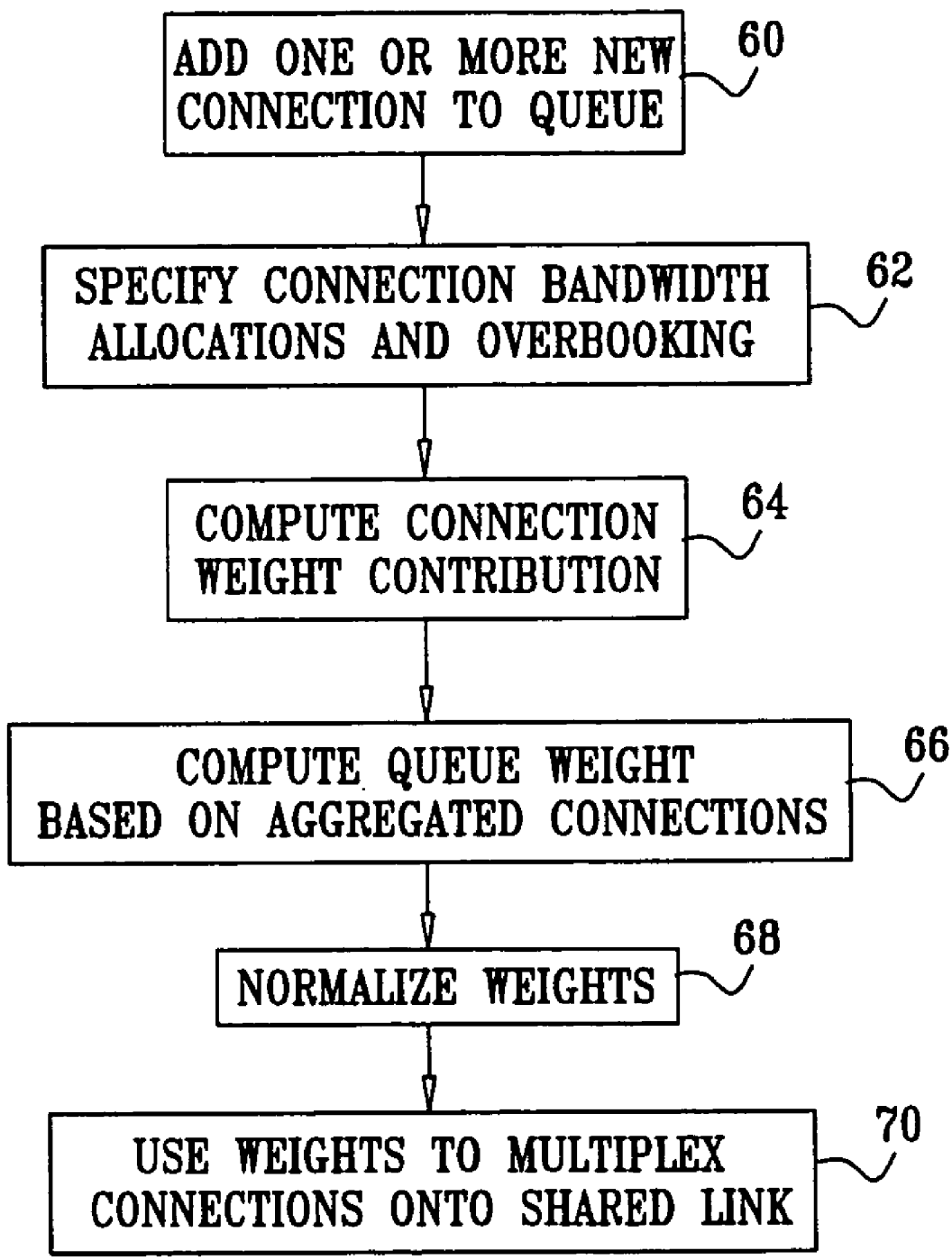
FIG. 3 is a flow chart that schematically illustrates a method for calculating queue weights, in accordance with an embodiment of the present invention.

FIG. 3 is a flow chart that schematically illustrates a method used by CAC 32 in computing weights 48, in accordance with an embodiment of the present invention. The method is initiated at whenever one or more new connections are added in system 20 (including at system startup), at a connection addition step 60. This new connection is assigned to one of queues 42, 44, 46, ..., as described above. The method may also be initiated when a connection is modified or removed from the system, in order to recompute the weights of the remaining connections under these conditions.

The bandwidth allocations for the new connection are specified, at an allocation step 62. Typically, each new connection is assigned to a certain CoS, according to which CAC 32 determines the bandwidth allocations and overbooking ratios for the connection. In the present example, it will be assumed that these allocations are expressed in terms of CIR ($CoS_j$) and EIR($CoS_j$), wherein $CoS_j$ refers to the jth class of service, to which the given connection is assigned. The overbooking ratios of the CIR and EIR traffic in $CoS_j$ are expressed as $OVB_{CIR}(CoS_j)$ and $OVB_{EIR}(COS_j)$. Although $OVB_{CIR}$ is often set equal to 1 (no overbooking), we consider here the more general case in which CIR($CoS_j$) may be overbooked. Furthermore, although the present embodiment is described in terms of CIR and EIR, some or all of connections 40 may alternatively have more than two categories of bandwidth allocations, in addition to or instead of CIR and/or EIR. The method of FIG. 3 may be extended in a straightforward manner to deal with these multiple categories.

Based on the bandwidth allocations and overbooking ratios for the new connection added at step 60, CAC 32 computes the weight contribution of the connection, at a contribution computation step 64. The weight contribution for a given connection in $CoS_j$ is $\alpha(CoS_j)CIR(CoS_j)+\beta(CoS_j)EIR(CoS_j)$. Here $\alpha$ and $\beta$ are bias coefficients for the CIR and EIR allocations, respectively. These coefficients typically depend on $OVB_{CIR}(CoS_j)$ and $OVB_{EIR}(CoS_j)$, in such a way as to give greater weight to allocations that have smaller overbooking ratios, and vice versa. For example, it is possible to set $\alpha(CoS_j)=1/OVB_{CIR}(CoS_j)$ and $\beta(COS_j)=1/OVB_{EIR}(CoS_j)$. Since $OVB_{CIR}$ is generally much less than $OVB_{EIR}$, $\alpha$ will generally be much greater than $\beta$ for any given CoS. Alternatively, the bias coefficients may have a different functional dependence on the overbooking ratios. In any case, CAC 32 is able to calculate these values automatically, without further user input.

For each queue i, CAC 32 calculates the queue weight $W_i$ based on the individual weight contributions of the connections sharing the queue, at a queue weight computation step 66. Typically, the queue weight for a given queue is simply the sum of the weight contributions of the individual connections that share the queue:

$$W_i = \alpha(CoS_1)\cdot\Sigma CIR(CoS_1)+\beta(CoS_1)\cdot\Sigma EIR(CoS_1)+\alpha(CoS_2)\cdot\Sigma CIR(CoS_2)+\beta(CoS_2)\cdot\Sigma EIR(CoS_2)+\ldots+\alpha(CoS_N)\cdot\Sigma CIR(CoS_N)+\beta(CoS_N)\cdot\Sigma EIR(CoS_N) \quad (1)$$

The summations in equation (1) are taken over all connections that share the same $CoS_j$.

The above calculation assumes that CIR traffic and EIR traffic are aggregated together in the same queue for each connection. Alternatively, aggregator 28 may be configured to serve the guaranteed portion of the CIR traffic preferentially, before it serves the remaining CIR and EIR traffic. The guaranteed CIR bandwidth for $CoS_j$ is given by CIR($CoS_j$)/$OVB_{CIR}(COS_j)$, so that the remainder of the CIR bandwidth, to be handled by fair scheduling of aggregator 28, is CIR($CoS_j$)[1−1/$OVB_{CIR}(CoS_j)$]. In this case, the weights determined by CAC 32 at steps 62 and 64 are applied only to the CIR remainder bandwidth and to the EIR bandwidth. Therefore, the weight contributions of the individual connections are now given by $\alpha(CoS_j)CIR(CoS_j)[1-1/OVB_{CIR}(CoS_j)]+\beta(CoS_j)EIR(CoS_j)$, and the queue weights are given by:

$$W_i = \alpha(CoS_1) \cdot \Sigma CIR(CoS_1)[1-1/OVB_{CIR}(CoS_1)] + \beta(CoS_1) \cdot \Sigma EIR(CoS_1) + \alpha(CoS_2) \cdot \Sigma CIR(CoS_2)[1-1/OVB_{CIR}(CoS_2)] + \beta(CoS_2) \cdot \Sigma EIR(CoS_2) + \ldots + \alpha(CoS_N) \cdot \Sigma CIR(CoS_N)[1-1/OVB_{CIR}(CoS_N)] + \beta(CoS_N) \cdot \Sigma EIR(CoS_N) \quad (2)$$

The bias coefficients $\alpha$ and $\beta$ may be calculated as described above. Of course, if the CIR allocations are not overbooked at all ($OVB_{CIR}=1$), then the CIR terms drop out of equation (2).

Alternatively, we may write $\alpha'(CoS_j) = \alpha(CoS_j)[1-1/OVB_{CIR}(CoS_j)]$. Using this identity, equation (2) reduces to the same form as equation (1):

$$W_i = \alpha'(CoS_1) \cdot \Sigma CIR(CoS_1) + \beta(CoS_1) \cdot \Sigma EIR(CoS_1) + \alpha'(CoS_2) \cdot \Sigma CIR(CoS_2) + \beta(CoS_2) \cdot \Sigma EIR(CoS_2) + \ldots + \alpha'(CoS_N) \cdot \Sigma CIR(CoS_N) + \beta(CoS_N) \cdot \Sigma EIR(CoS_N) \quad (3)$$

If the CIR is not overbooked, $\alpha' = \alpha$, so that equation (3) is simply a more general form of equation (1).

The results of equation (1) or (2) above generally have the form of floating-point numbers. Switch 50, however, typically comprises a hardware component, which is controlled by fixed-point (integer) weight values stored in control registers. Therefore, CAC 32 normalizes the weights calculated at step 66 in order to generate scheduling weights 48, at a weight normalization step 68. In one embodiment, a simple linear conversion is used:

$$W_i(\text{Integer}) = \text{INT}\{W_i(\text{Float}) * \text{MaxWeight(Integer)} / \text{MaxWeight(Float)}\} \quad (4)$$

Here MaxWeight(Integer) is the largest integer that the weight registers of switch 50 can hold (typically given by $2^{RegisterSize}$), while MaxWeight (Float) is the maximum of $W_i$(Float) taken over all of queues 42, 44, 46 . . . .

Alternatively, a non-linear mapping may be used at step 68 in order to provide better weight resolution over the available integer range. For example, a histogram equalization procedure may be used to spread the normalized weights evenly over the available integer range. Alternatively or additionally, an arctangent or log function may be used to provide a relatively greater share of the available link bandwidth to queues with low floating-point weights. Other mapping schemes will be apparent to those skilled in the art.

The normalized weights are loaded into the control registers of switch 50, which applies the weights in multiplexing among queues 42, 44, 46, . . . , at a multiplexing step 70.

Although for the sake of simplicity, the embodiments described above relate only to allocation of bandwidth and multiplexing of traffic on a single shared link, the principles of the present invention may similarly be applied in more complex network topologies, and in fair sharing of access to other system resources. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:

setting respective overbooking ratios for multiple categories of data traffic;

assigning respective bandwidth allocations to a plurality of connections for transmitting the data traffic in one or more of the categories over a network;

coupling the data traffic from the connections into respective queues, such that each of the queues is associated with one or more of the connections;

computing respective weights for the queues responsively to the bandwidth allocations and to the overbooking ratios of the categories of the data traffic to be transmitted on the connections that are associated with each of the queues; and multiplexing among the queues responsively to the respective weights so as to transmit the data traffic from the connections over a link in the network, wherein computing the respective weights comprises computing respective weight contributions of the connections responsively to the categories of the data traffic transmitted on each of the connections, and summing the weight contributions of the connections that are associated with each of the queues, and wherein the multiple categories comprises classes of service, each having at least one of a committed information rate (CIR) and an excess information rate (EIR) and having respective CIR and EIR overbooking ratios, and wherein assigning the respective bandwidth allocations comprises assigning each of the connections to at least one of the classes of service, and wherein computing the respective weight contributions comprises determining the weight contributions responsively to the classes of service of the connections, and wherein computing the respective weight contributions comprises setting a respective weight contribution of each of the connections belonging to a given class of service $CoS_j$ to be $\alpha(CoS_j)CIR(CoS_j)+\beta(CoS_j)EIR(CoS_j)$, wherein $\alpha$ and $\beta$ are bias coefficients that are determined responsively to the CIR and EIR overbooking ratios of the given class of service.

2. The method according to claim 1, wherein computing the respective weights comprises biasing the weights so as to favor, in determining the weights, the categories of the data traffic for which the respective overbooking ratios are relatively smaller over the categories of the data traffic for which the respective overbooking ratios are relatively greater.

3. The method according to claim 2, wherein biasing the weights comprises weighting the bandwidth allocations in inverse proportion to the overbooking ratios in order to compute the respective weights.

4. The method according to claim 1, wherein $\alpha$ and $\beta$ are respectively inversely proportional to the CIR and EIR overbooking ratios of the given class of service.

5. The method according to claim 1, wherein computing the respective weights comprises biasing the weights, responsively to the overbooking ratios, so that the CIR has a relatively greater impact on the weights than does the EIR.

6. The method according to claim 1, wherein computing the respective weights comprises applying a non-linear mapping to the computed weights.

7. A method for communication, comprising:

setting respective overbooking ratios for multiple categories of data traffic;

assigning respective bandwidth allocations to a plurality of connections for transmitting the data traffic in one or more of the categories over a network;

coupling the data traffic from the connections into respective queues, such that each of the queues is associated with one or more of the connections;

computing respective weights for the queues responsively to the bandwidth allocations and to the overbooking ratios of the categories of the data traffic to be transmitted on the connections that are associated with each of the queues; and multiplexing among the queues responsively to the respective weights so as to transmit the data traffic from the connections over a link in the network, wherein computing the respective weights comprises computing respective weight contributions of the connections responsively to the categories of the data traffic transmitted on each of the connections, and summing the weight contributions of the connections that are associated with each of the queues, and wherein the multiple categories comprises classes of service, each having at least one of a committed information rate (CIR) and an excess information rate (EIR) and having respective CIR and EIR overbooking ratios, and wherein assigning the respective bandwidth allocations comprises assigning each of the connections to at least one of the classes of service, and wherein computing the respective weight contributions comprises determining the weight contributions responsively to the classes of service of the connections, and wherein multiplexing among the queues comprises preferentially serving a guaranteed portion of the CIR, and multiplexing a remainder of the CIR and the EIR, and wherein setting a respective weight contribution of each of the connections belonging to a given class of service $CoS_j$ to be $\alpha(CoS_j)CIR(CoS_j)[1-1/OVB_{CIR}(CoS_j)]+\beta(CoS_j)EIR(CoS_j)$, wherein $OVB_{CIR}$ is the overbooking ratio of the CIR in the given class of service.

8. The method according to claim 7, wherein $\alpha$ and $\beta$ are respectively inversely proportional to the CIR and EIR overbooking ratios of the given class of service.

9. Apparatus for conveying data traffic over a plurality of connections on a network, each connection being configured to carry one or more categories of the data traffic, the apparatus comprising:

a multiplexer, which comprises a set of queues, each such queue being configured to receive the data traffic on one or more of the connections that are associated with the queue, and which is adapted to multiplex among the queues responsively to respective weights that are assigned to the queues so as to transmit the data traffic from the queues over a link in the network; and a controller, which is coupled to receive a definition of respective bandwidth allocations and respective overbooking ratios of the categories of the data traffic carried by each of the connections, and which is adapted, responsively to the definition, to compute the respective weights to be assigned to the queues responsively to the bandwidth allocations and to the overbooking ratios of the categories of the data traffic carried by the connections that are associated with each of the queues, wherein the controller is adapted to compute respective weight contributions of the connections responsively to the categories of the data traffic transmitted on each of the connections, and to sum the weight contributions of the connections that are associated with each of the queues in order to determine the respective weights to assign to the queues, and wherein the multiple categories comprises classes of service, each having at least one of a committed information rate (CIR) and an excess information rate (EIR) and having respective CIR and EIR overbooking ratios, and wherein each of the connections is assigned to at least one of the classes of service, and wherein the controller is adapted to determine the respective weight contributions based on the classes of service of the connections, and wherein the controller is adapted to set a respective weight contribution of each of the connections belonging to a given class of service $CoS_j$ to be $\alpha(CoS_j)CIR(CoS_j)+\beta(CoS_j)EIR(CoS_j)$, wherein $\alpha$ and $\beta$ are bias coefficients that are determined responsively to the CIR and EIR overbooking ratios of the given class of service.

10. The apparatus according to claim 9, wherein the controller is adapted to bias the weights so as to favor, in computing the weights, the categories of the data traffic for which the respective overbooking ratios are relatively smaller over the categories of the data traffic for which the respective overbooking ratios are relatively greater.

11. The apparatus according to claim 10, wherein the controller is adapted to bias the weights in inverse proportion to the respective overbooking ratios.

12. The apparatus according to claim 9, wherein $\alpha$ and $\beta$ are respectively inversely proportional to the CIR and EIR overbooking ratios of the given class of service.

13. The apparatus according to claim 9, wherein the controller is adapted to bias the weights, responsively to the overbooking ratios, so that the CIR has a relatively greater impact on the weights than does the EIR.

14. The apparatus according to claim 9, wherein the controller is adapted to apply a non-linear mapping to the computed weights.

15. Apparatus for conveying data traffic over a plurality of connections on a network, each connection being configured to carry one or more categories of the data traffic, the apparatus comprising:

a multiplexer, which comprises a set of queues, each such queue being configured to receive the data traffic on one or more of the connections that are associated with the queue, and which is adapted to multiplex among the queues responsively to respective weights that are assigned to the queues so as to transmit the data traffic from the queues over a link in the network; and a controller, which is coupled to receive a definition of respective bandwidth allocations and respective overbooking ratios of the categories of the data traffic carried by each of the connections, and which is adapted, responsively to the definition, to compute the respective weights to be assigned to the queues responsively to the bandwidth allocations and to the overbooking ratios of the categories of the data traffic carried by the connections that are associated with each of the queues, wherein the controller is adapted to compute respective weight contributions of the connections responsively to the categories of the data traffic transmitted on each of the connections, and to sum the weight contributions of the connections that are associated with each of the queues in order to determine the respective weights to assign to the queues, and wherein the multiple categories comprises classes of service, each having at least one of a committed information rate (CIR) and an excess information rate (EIR) and having respective CIR and EIR overbooking ratios, and wherein each of the connections is assigned to at least one of the classes of service, and wherein the controller is adapted to determine the respective weight contributions based on the classes of service of the connections, and wherein the multiplexer is adapted to preferentially serve a guaranteed portion of the CIR, and to multiplex a remainder of the CIR and the EIR, and wherein the controller is adapted to set a respective weight contribution of each of the connections belonging to a given class of service $CoS_j$ to be $\alpha(CoS_j)CIR(CoS_j)[1-1/OVB_{CIR}(CoS_j)]+\beta(CoS_j)EIR(CoS_j)$, wherein $OVB_{CIR}$ is the overbooking ratio of the CIR in the given class of service.

16. The apparatus according to claim 15, wherein $\alpha$ and $\beta$ are respectively inversely proportional to the CIR and EIR overbooking ratios of the given class of service.

* * * * *